US006608484B2

(12) United States Patent
Grantham et al.

(10) Patent No.: US 6,608,484 B2
(45) Date of Patent: Aug. 19, 2003

(54) DIAGNOSTIC FUEL STORAGE SYSTEM

(75) Inventors: Rodger P. Grantham, Springfield, MO (US); Glen K. Walker, Springboro, OH (US)

(73) Assignee: Vapor Systems Technologies, Inc., Dayton, OH (US)

( * ) Notice: Subject to any disclaimer, the term of this patent is extended or adjusted under 35 U.S.C. 154(b) by 0 days.

(21) Appl. No.: 09/963,107

(22) Filed: Sep. 24, 2001

(65) Prior Publication Data

US 2003/0057954 A1 Mar. 27, 2003

(51) Int. Cl.[7] .......................... G01N 27/62

(52) U.S. Cl. .......................... 324/464; 324/460

(58) Field of Search .......................... 73/309; 180/165; 324/460, 464; 425/547, 572; 95/19, 54

(56) References Cited

U.S. PATENT DOCUMENTS

| | | | | | |
|---|---|---|---|---|---|
| 4,349,882 A | * | 9/1982 | Asmundsson et al. | 425/547 |
| 5,132,923 A | * | 7/1992 | Crawford et al. | 702/51 |
| 5,363,093 A | * | 11/1994 | Williams et al. | 340/605 |
| 5,464,466 A | | 11/1995 | Nanaji et al. | |
| 5,571,310 A | | 11/1996 | Nanaji | |
| 5,985,002 A | | 11/1999 | Grantham | |
| 6,253,743 B1 | * | 7/2001 | Hyodo et al. | 123/520 |
| 6,293,996 B1 | * | 9/2001 | Grantham et al. | 95/47 |

* cited by examiner

*Primary Examiner*—Jay Patidar
*Assistant Examiner*—Walter Benson
(74) *Attorney, Agent, or Firm*—Killworth, Gottman, Hagan & Schaeff LLP

(57) ABSTRACT

A diagnostic fuel storage system is provided and includes a pressure sensor configured to monitor pressure at one or more diagnostic points within the system. In accordance with one embodiment of the present invention, a diagnostic fuel storage system is provided comprising at least one storage tank, a filter system, at least one pump, and at least one pressure sensor. The storage tank includes a fuel vapor vent port. The filter system comprises a filter input port coupled to the fuel vapor vent port. The pump is positioned to cause fuel vapor to pass through the filter input port. The storage tank, the filter system, and the pump are arranged such that the storage tank and selected fuel vapor ducts in communication with the storage tank operate below atmospheric pressure. The pressure sensor is configured to monitor pressure at one or more diagnostic points within the storage tank, the selected fuel vapor ducts, and combinations thereof. In this manner, the pressure sensor is operative to provide an indication of operation above atmospheric pressure. According to another embodiment of the present invention, a diagnostic fuel storage system is provided comprising a plurality of fuel storage systems, a central data processor, and a communications link coupling the central data processor to each of the fuel storage systems. The central data processor is configured to process pressure data sensed by the pressure sensors.

9 Claims, 4 Drawing Sheets

DIAGNOSTIC FUEL STORAGE SYSTEM

CROSS REFERENCE TO RELATED APPLICATIONS

This application is related to U.S. patent application Ser. No. 09/440,520, filed Nov. 15, 1999, for FUEL STORAGE SYSTEM WITH VENT FILTER ASSEMBLY (now U.S. Pat. No. 6,293,996), and U.S. patent application Ser. No. 09/036,119, filed Mar. 6, 1998, for FUEL STORAGE SYSTEM WITH VENT FILTER ASSEMBLY (now U.S. Pat. No. 5,985,002).

BACKGROUND OF THE INVENTION

The present invention relates to a system for reducing the discharge of pollutants from underground gasoline storage tanks. The system is arranged to discharge pollutant free air when the pressure within the system reaches a predetermined level. Air to be discharged is separated from gasoline vapor within the storage system prior to its discharge.

U.S. Pat. No. 5,464,466, to Nanaji et al., describes a fuel storage tank vent filter system where a filter or fractionating membrane is used to capture pollutants from the vapor vented from the system's fuel storage tanks. A property of the membrane is that it will capture or collect selected pollutants including hydrocarbons. The captured pollutants are drawn from the membrane as a liquid and returned to the fuel storage tanks. The fractionating membrane comprises a plurality of stacked and bound thin sheets. Each sheet has a hole formed in its center to form an aperture in the stack extending axially from end to end. A perforated removal pipe must be positioned in the axial aperture to enable the captured vapors to be drawn out of the membrane under a vacuum created by a vacuum pump. The throughput of the system is limited because pollutant molecules, as opposed to air molecules, must be pulled through the fractionating membrane in liquid form. U.S. Pat. No. 5,571,310 discloses the use of such a membrane in an organic chemical vent filter system. Harmful volatile organic compounds (VOC's) are drawn through the membrane by using a vacuum pump to create a pressure drop of one atmosphere across the membrane. The pump is positioned between the membrane and the tanks, as opposed to between the membrane and the atmosphere.

These prior art systems are inadequate, however, because, to achieve adequate throughput, a substantial pressure drop, e.g., one atmosphere, must be created across the fractionating membrane. Further, the fractionating membrane of these prior art systems, and the associated hardware, is typically too large and costly for many applications. The pumping and fluid transfer system is likely to be more costly and difficult to assemble because of the relatively high levels of vacuum created in the system. Finally, the prior art systems do not expel substantially pollutant free air to the atmosphere. Rather, pressure within the tanks is reduced by merely condensing the pollutant vapors to liquid and returning them to the tanks. Accordingly, there is a need for a compact fuel storage system vent filter assembly that provides improved filtering and throughput at a competitive cost.

BRIEF SUMMARY OF THE INVENTION

This need is met by the present invention wherein a diagnostic fuel storage system is provided including a pressure sensor configured to monitor pressure at one or more diagnostic points within the system. In accordance with one embodiment of the present invention, a diagnostic fuel storage system is provided comprising at least one storage tank, a filter system, at least one pump, and at least one pressure sensor. The storage tank includes a fuel vapor vent port. The filter system comprises a filter input port coupled to the fuel vapor vent port. The pump is positioned to cause fuel vapor to pass through the filter input port. The storage tank, the filter system, and the pump are arranged such that the storage tank and selected fuel vapor ducts in communication with the storage tank operate below atmospheric pressure. The pressure sensor is configured to monitor pressure at one or more diagnostic points within the storage tank, the selected fuel vapor ducts, and combinations thereof. In this manner, the pressure sensor is operative to provide an indication of operation above atmospheric pressure.

According to another embodiment of the present invention, a diagnostic fuel storage system is provided comprising a plurality of fuel storage systems, a central data processor, and a communications link coupling the central data processor to each of the fuel storage systems. The central data processor is configured to process pressure data sensed by the pressure sensors.

Accordingly, it is an object of the present invention to provide a diagnostic fuel storage system configured to monitor and improve fuel storage system performance. Further, it is an object of the present invention to provide a filter system and associated pumping hardware designed to optimize the efficiency of the fuel storage system. Other objects of the present invention will be apparent in light of the description of the invention embodied herein.

BRIEF DESCRIPTION OF THE SEVERAL VIEWS OF THE DRAWINGS

The following detailed description of the preferred embodiments of the present invention can be best understood when read in conjunction with the following drawings, where like structure is indicated with like reference numerals and in which.

DETAILED DESCRIPTION OF THE PREFERRED EMBODIMENTS

Figure 1:
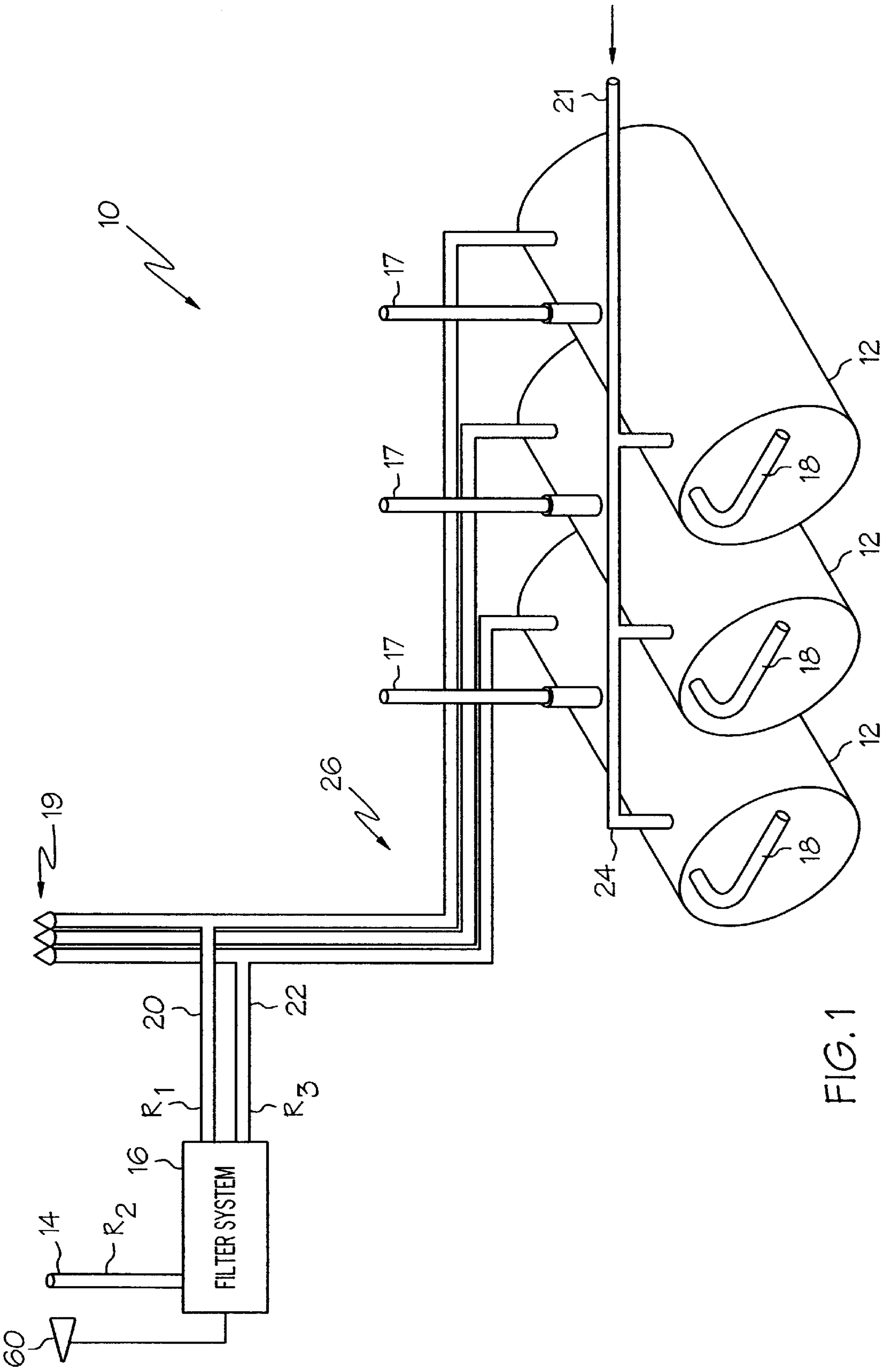
FIG. 1 is a schematic illustration of a fuel storage system according to the present invention.

A fuel storage system 10 according to the present invention is illustrated in FIGS. 1–5. Referring initially to FIG. 1, the fuel storage system 10 comprises a plurality of storage tanks 12, an air exhaust port 14, and a filter system 16. The storage tanks 12 are coupled to fuel inlet ports 17, fuel delivery ports 18, pressure relief ports 19, a fluid vent port 20, a vapor return port 21, a pollutant return port 22, vapor pressure equalization piping 24, and vent piping 26. The fuel dispensing nozzles of the system (not shown) are arranged to return fuel vapor to the storage tanks 12 via the vapor return ports 21. As will be appreciated by those practicing the present invention, the specifics of the design of the storage tanks 12, fuel inlet ports 17, fuel delivery ports 18, pressure relief ports 19, fluid vent port 20, vapor return port 21, pollutant return port 22, vapor pressure equalization piping 24, and vent piping 26, is conventionally available information and is not the subject of the present invention. For example, reference is made to U.S. Pat. No. 5,464,466, issued to Nanaji et al. on Nov. 7, 1995; U.S. Pat. No. 5,484,000, issued to Hasselmann on Jan. 16, 1996; U.S. Pat. No. 4,566,504, issued to Furrow et al. on Jan. 28, 1986; U.S. Pat. No. 4,687,033, issued to Furrow et al. on Aug. 18, 1987; U.S. Pat. No. 5,035,271, issued to Carmack et al. on Jul. 30, 1991; U.S. Pat. No. 5,051,114, issued to Nemser et al. on Sep. 24, 1991; U.S. Pat. No. 5,141,037, issued to Carmack et al. on Aug. 25, 1992; U.S. Pat. No. 5,590,697, issued to Benjey et al. on Jan. 7, 1997; U.S. Pat. No. 5,592,963, issued to Bucci et al. on Jan. 14, 1997; U.S. Pat. No. 5,592,979, issued to Payne et al. on Jan. 14, 1997; U.S. Pat. No. 5,620,030, issued to Dalhart et al. on Apr. 15,1997; U.S. Pat. No. 5,620,031, issued to Dalhart et al. on Apr. 15, 1997; and U.S. Pat. No. 5,678,614, issued to Grantham on Oct. 21, 1997, the disclosures of which are incorporated herein by reference. It is noted that, for the purposes of describing and defining the present invention, any reference herein to a fluid denotes either a gas, a liquid, a gas/liquid mixture, or a gas, liquid, or gas liquid mixture carrying particulate matter.

Figure 2:
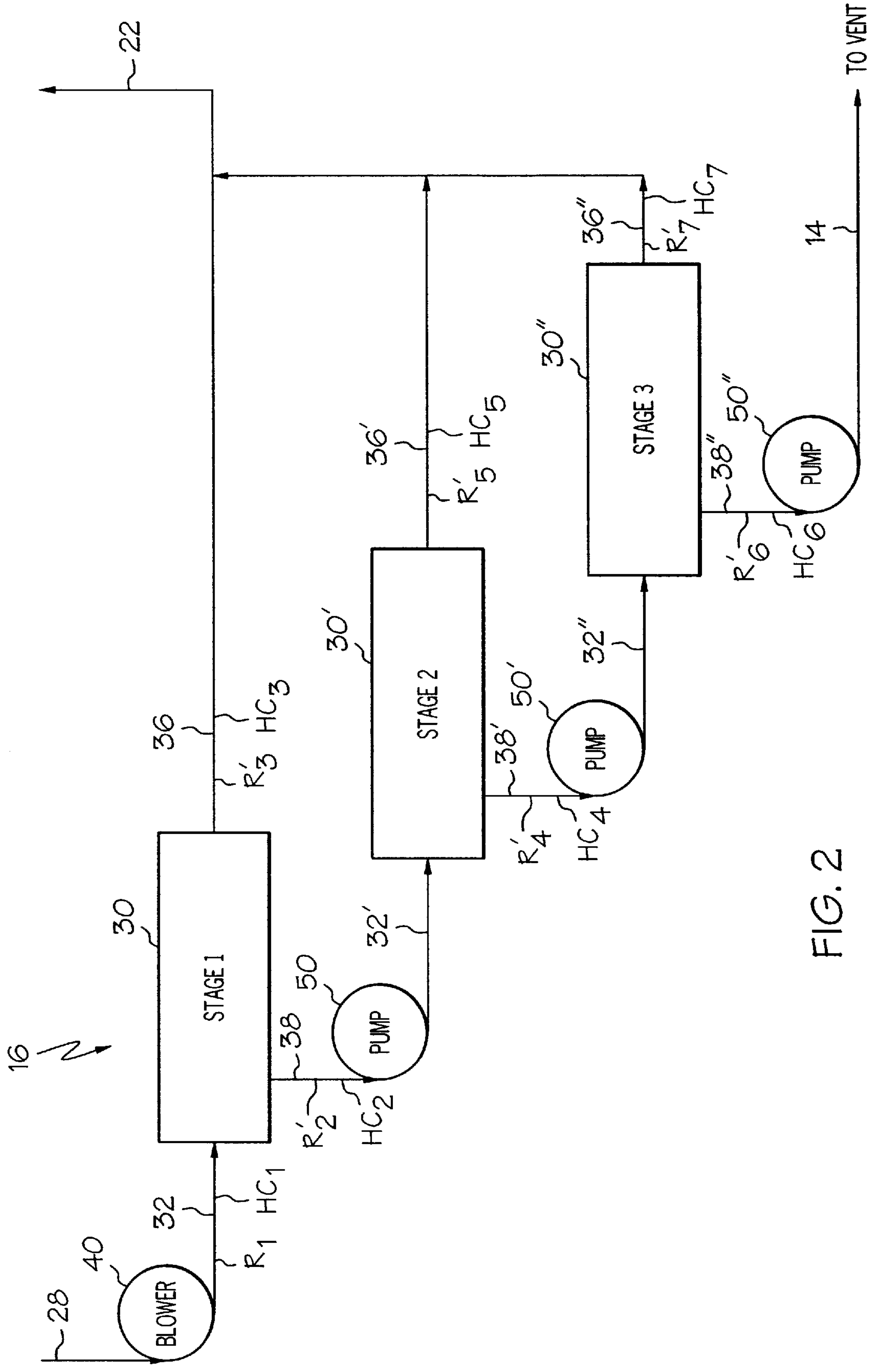
FIG. 2 is a schematic illustration of a filter system portion of a fuel storage system according to the present invention.
Figure 3:
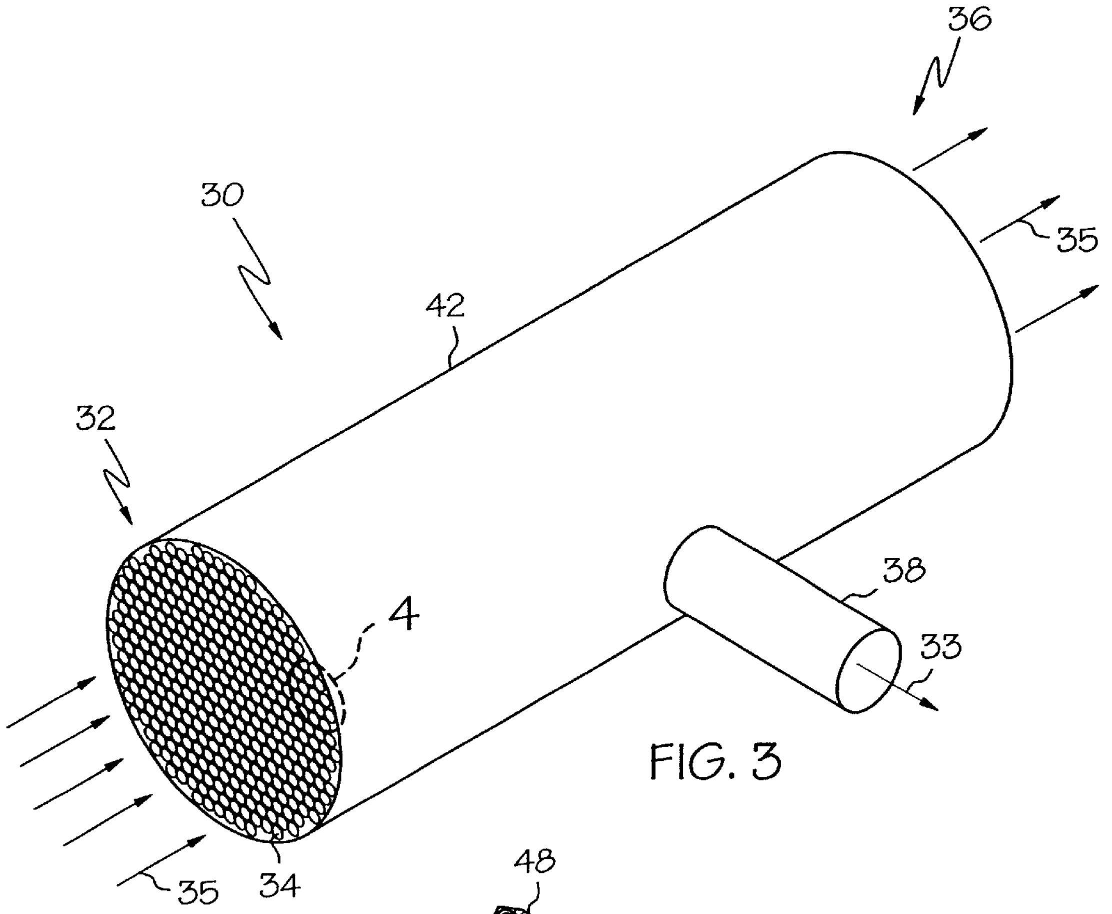
FIG. 3 is an illustration of a filter assembly portion of a fuel storage system according to the present invention.
Figure 4:
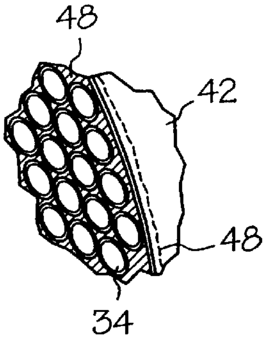
FIG. 4 is a blown up view, partially broken away, of a portion of the filter assembly illustrated in FIG. 3.
Figure 5:
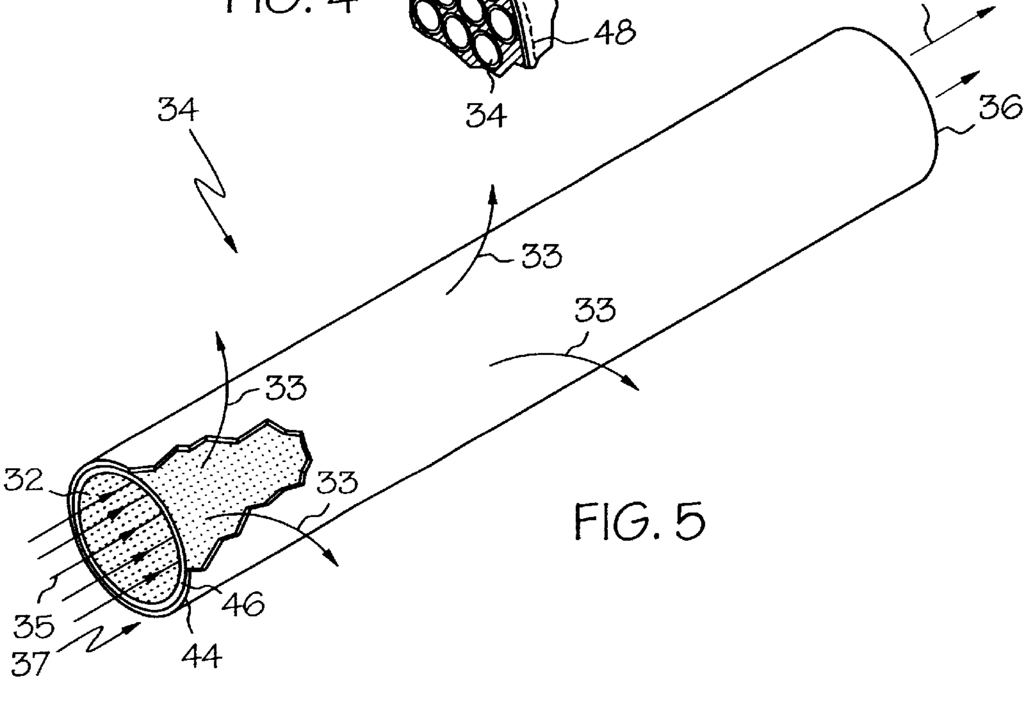
FIG. 5 is an illustration, partially broken away, of a fuel vapor duct portion of a fuel storage system according to the present invention.

Referring now to FIGS. 2–5, the filter system 16 comprises a filter assembly 30, a primary pump or blower 40 coupled to a primary input port 28, and a secondary pump 50. The filter assembly 30 includes a filter input port 32, a plurality of fuel vapor ducts 34 (see FIGS. 3 and 4), a primary filter output port 36, and a secondary filter output port 38. The filter input port 32 is directly coupled to the fluid vent port 20 illustrated in FIG. 1 and the primary filter output port 36 is directly coupled to the pollutant return port 22, also illustrated in FIG. 1. The filter assembly 30 illustrated in FIGS. 3–5 is a product available from Compact Membrane Systems Inc., Wilmington, Del., USA, and, as is illustrated with particularity in FIG. 5, includes the porous tube 46 and a conventional, commercially available air permeable membrane 44. A conventional, commercially available air permeable membrane suitable for use with the present invention is shown in U.S. Pat. No. 5,051,114. As is described in detail below, suitable membranes for use in the present invention will pass the air component of an air/fuel vapor and inhibit passage of the pollutant component (e.g., VOC's) of the air/fuel vapor. As will be appreciated by those practicing the present invention, alternatives to the filter assembly design illustrated in FIGS. 2–5 will be suitable for use within the scope of the present invention.

The fuel vapor ducts 34 define a substantially unobstructed flow path 35 extending from the filter input port 32 to the primary filter output port 36. At least a portion of, and preferably all of, each fuel vapor duct 34 forms an air-permeable partition 37 designed to pass an air component of fluid within the fuel vapor duct 34 through the air permeable partition 37, see directional arrows 33 in FIG. 3. Passage of a pollutant component of fluid, e.g., VOC's, within the fuel vapor duct 34 through the air-permeable partition 37 is inhibited. Specifically, the air-permeable partition 37 comprises an air-permeable membrane 44 supported by a porous tube 46 and the substantially unobstructed flow path 35 extends along a longitudinal axis of the porous tube 46.

It is noted that, although the air permeable partition 37 of the present invention is referred to herein as air-permeable, the membrane may actually favor the passage of oxygen over nitrogen, creating a nitrogen enriched VOC stream in which fuel vapor condenses. It is also noted that the air permeable partition 37 of the present invention may also be designed to pass a water vapor component of fluid within the fuel vapor duct 34 through the air permeable partition 37. The passage of the water vapor component reduces water vapor contamination of the fuel supply overall. This aspect of the present invention is particularly advantages when using fuel components having an affinity for water vapor.

Referring to FIG. 4, it is noted that a potting compound 48 is preferably interposed between opposite end portions of adjacent fuel vapor ducts 34 to ensure that all of the fluid incident upon the filter input port 32 is forced to pass through the interior of the fuel vapor ducts 34, as opposed to through the spaces between the fuel vapor ducts 34. For the purposes of describing and defining the present invention, it is noted that when reference is made herein to the substantially unobstructed flow path 35, the presence of the potting compound 48 is not considered to be a substantial obstruction.

Referring to FIGS. 1, 2, 3, and 5, the secondary filter output port 38 is partitioned from the fuel vapor duct 34 by the air-permeable partition 37 and is directly coupled to the air exhaust port 14. The primary pump 40 is positioned to cause fluid to pass from the filter input port 32 through each fuel vapor duct 34 to the primary filter output port 36. The secondary pump 50 is positioned to cause the air component within the fuel vapor duct 34 to pass through the air-permeable partition 37 to the secondary filter output port 38 and the air exhaust port 14.

As is clearly illustrated in FIG. 3, the filter system 16 includes a plurality fuel vapor ducts 34 that define respective substantially linear unobstructed flow paths 35 therein extending from the filter input port 32 to the primary filter output port 36. Each of the fuel vapor ducts 34 form separate portions of a collective air-permeable partition 37 and are enclosed within a common fuel vapor duct enclosure 42. The filter input port 32, the primary filter output port 36, and the secondary filter output port 38 are formed in the common fuel vapor duct enclosure 42. The arrangement of the fuel vapor ducts 34 and the primary pump 40 is such that fluid passes from the filter input port 32 through the fuel vapor ducts 34 to the primary filter output port 36 with a negligible pressure drop. This negligible pressure drop is largely attributable to the unobstructed nature of the flow paths 35.

Reference will now be made to FIGS. 1 and 2 in discussing the characteristics of the primary pump or blower 40 and the secondary pump 50, and the various flow rates generated within the system 16. The primary pump 40 has a characteristic pumping capacity capable of generating a first volumetric fluid flow rate $R_1$. Specifically, in some preferred embodiments of the present invention, the primary pump 40 has a characteristic pumping capacity capable of generating a fluid flow of between approximately 150 standard cubic feet per hour and approximately 1500 standard cubic feet per hour. In one embodiment of the present invention, the primary pump 40 has a characteristic pumping capacity capable of generating a fluid flow of approximately 320 standard cubic feet per hour. The secondary pump 50 has a characteristic pumping capacity capable of generating, in combination with any downstream pumps, a second volumetric fluid flow rate $R_2$ through the air permeable partition 37 to the secondary filter output port 38. Additionally, the secondary pump 50 has a characteristic pumping capacity capable of generating, in combination with the primary pump 40, a third volumetric fluid flow rate $R_3$ through the fuel vapor ducts 34 to the primary filter output port 36.

Fuel storage systems employing vapor return hardware are characterized by an average net fluid volume return rate which is the difference between the volume of vapor returned to the storage tanks of the system and the volume of fluid dispensed to a fuel receiving tank or lost to the ambient. The second volumetric fluid flow rate $R_2$ is selected such that it is greater than a characteristic average net fluid volume return rate of the fuel storage system to ensure that harmful pollutants are not vented to the ambient due to over pressurization, and to ensure that the filter system 16 of the present invention operates at maximum efficiency. For example, in a typical fuel storage system utilized to dispense on the order of 250,000 gallons of fuel per month, the second volumetric fluid flow rate $R_2$ is approximately 40 standard cubic feet per hour. Further, the first volumetric fluid flow rate $R_1$ is preferably approximately two to eight times the value of the second volumetric fluid flow rate $R_2$. The specific value of the selected second volumetric fluid flow rate $R_2$ is largely dependent upon the average fuel dispensing rate of the particular fuel storage system, however, it is contemplated by the present invention that, in many preferred embodiments of the present invention, the second volumetric fluid flow rate $R_2$ is between approximately 15 standard cubic feet per hour and approximately 150 standard cubic feet per hour.

The characteristics of the filter system 16 of the present invention allow the secondary pump 50 to be designed to create a pressure drop of about 50 kPa across the air-permeable partition 37. In some embodiments of the present invention, it is contemplated that the secondary pump 50 may be designed to create a pressure drop of between approximately 25 kPa and approximately 75 kPa or, more preferably, between approximately 37.5 kPa and approximately 62.5 kPa across the air-permeable partition 37. All of these values represent a significant departure from the storage system of U.S. Pat. No. 5,571,310, where harmful VOC's from a storage system, as opposed to non-polluting air components from the storage system, are drawn through a membrane by using a vacuum pump to create a pressure drop of about one atmosphere (100 kPa) across the membrane.

The discussion herein of the embodiment of FIG. 2 describes the introduction of addition secondary pumps 50', 50". Regardless of the number of additional secondary pumps provided in the fuel storage system 10, there are specific advantages to ensuring that secondary pump or pumps 50 are designed not only to prevent over pressurization of the fuel storage system 10 but also to ensure that the fuel storage system may be maintained below atmospheric pressure.

Fugitive emissions are a continuing concern in fuel storage system design and operation. Operation of the fuel storage system below atmospheric pressure can reduce fugitive emissions. Indeed, system leaks in general are less problematic under these conditions because the leaks will not lead to the release of fugitives into the atmosphere. Rather, air from the atmosphere will tend to leak into the system because the system is operated below atmospheric pressure.

The petroleum industry has sought to further address the issue of fugitive emissions by making provisions for recovery of fuel vapors that are displaced from vehicle fuel tanks as fuel is discharged therein. Generally, there are two types of systems designed for vapor recovery—pressure balance recovery systems and vacuum assist vapor recovery systems. In both cases, the fuel delivery ports 18 are coupled to fuel dispensing nozzles that are specially adapted for recovering fuel vapor collected at the vehicle/nozzle interface. Operation of the fuel storage system below atmospheric pressure creates a vacuum in the fuel storage system 10 and, as such, provides a means to further facilitate vapor collection at the vehicle/nozzle interface. The respective structures of vapor return fuel dispensers, fuel dispensing nozzles, and vehicle storage tanks are well documented in the art and, as such, are not illustrated herein.

Vapor recovery systems commonly employ critical vapor return passageways to further enhance vapor recovery. Pressure drops within these passageways must be limited to ensure proper performance. The present invention is well-suited for ensuring proper vapor recovery because diagnostic information representative of pressure within the fuel storage system may be used to monitor pressure drop within the vapor return passageway of a vapor recovery system.

Operation of the fuel storage system of the present invention below atmospheric pressure is also advantageous because it provides a source of diagnostic information. Specifically, fugitive emissions and leaks may be detected by monitoring pressure at one or more of a number of diagnostic points within the fueling system. For example, a variation in system pressure would be detected if storage tank supply lines, couplings, or fuel inlet ports 17 where not properly sealed after a tank filling operation. Variations in system pressure could also be detected if any cracks, fissures, or other defects in the fuel storage system were present.

The pressure data may be compared to system run time and other operational data to provide a complete diagnostic picture of the system. The system run time and other operational data may be correlated with the pressure data to provide a system profile that may, in turn, be used to verify primary liquid leak detection equipment or to audit system performance. For example, during system down time or times of relatively low activity, the filter system of the present invention may be employed to pull a vacuum within the storage system and subsequent pressure decay data may be compared to previously measured or industry standard vacuum decay characteristics to detect leaks or test existing leak detection equipment.

Figure 6:
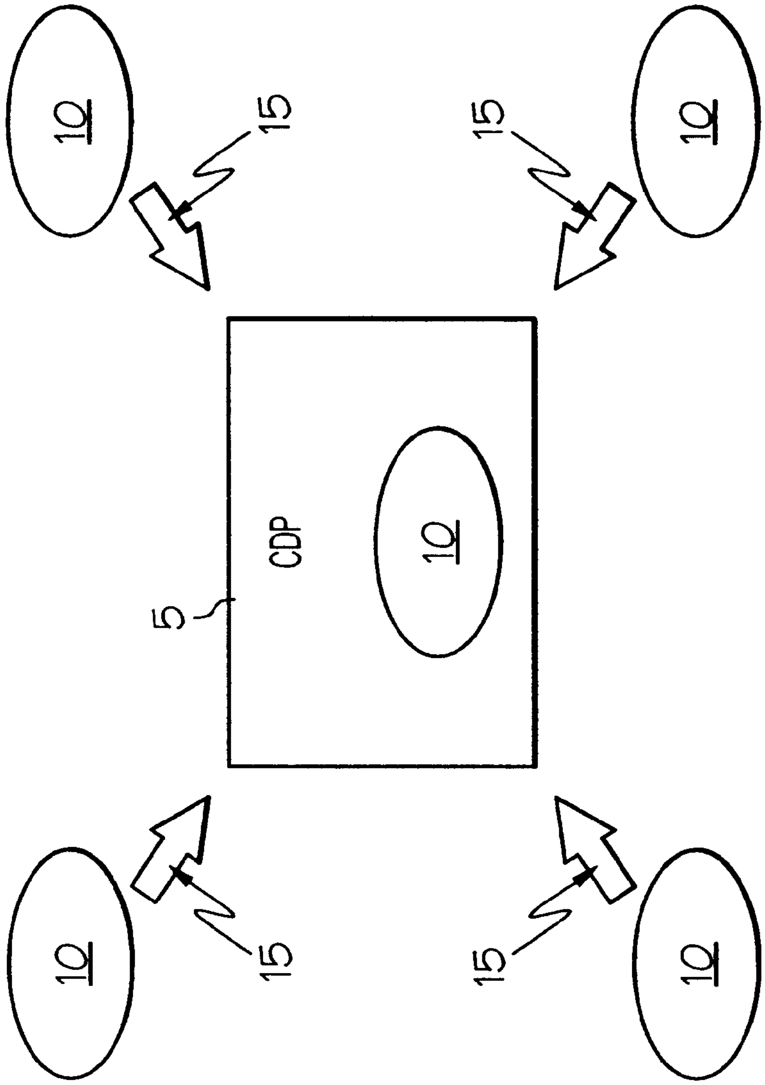
FIG. 6 is an illustration of a diagnostic fuel storage system according to the present invention.

Referring now to FIG. 6, pressure data may be transmitted from a pressure sensor in a fuel storage system 10 to a central data processor (CDP) 5 via a network, direct or indirect electrical links, optical links, RF links, or other types of communication links 15. The central data processor 5 may be in communication with a local fuel storage system 10, one or more remote storage systems 10, or both. In this manner, storage system data from one or more locations may be processed at a central location to diagnose system performance, generate a system profiles, and compare performance data of different systems. The storage system data may include pressure data sensed by the pressure sensors, fuel dispensing data, chronological data, and identification data.

The fuel storage system 10 of the present invention may also be used for pro-active diagnostics by employing the primary and/or secondary pumps 40, 50 to maintain the fuel storage system below atmospheric pressure. Global system data may then be monitored while a preferred degree of vacuum is maintained. Specifically, the central data processor 5 may include a system data monitor in communication with a variety of data sensors (not shown) including, but not limited to, hydrocarbon emission sensors, volumetric flow meters, volumetric fuel dispensing meters, pressure sensors, etc. In this manner, the central data processor 5 may be configured to track vent emissions (exhaust volume, % hydrocarbon emissions, etc.), dispensed fuel volume, vacuum level, leak detection data, etc., to create a global operating system profile. The global system profile may be compared with historical operating system profiles to evaluate system performance. The global operating system profile may also be analyzed to determine if system leaks or other operating problems are present and may be used to calibrate or validate existing leak detection equipment.

Referring now specifically to FIG. 2, in a preferred embodiment of the present invention, additional secondary pumps 50', 50" are employed in the filter system 16 of the present invention. As will be appreciated by those practicing the present invention, the first filter assembly 30, the primary pump 40, and the secondary pump 50, are substantially as described above. However, in the embodiment illustrated in FIG. 2, the fuel storage system 10 comprises two additional filter assemblies 30', 30" connected in series such that: (i) the secondary pump 30 has a characteristic pumping capacity capable of generating a second volumetric fluid flow rate $R_2'$ through the air permeable partition 37 to the secondary filter output port 38, and capable of generating, in combination with the primary pump 40, a third volumetric fluid flow rate $R_3'$ through the primary filter output port 36; (ii) the first additional secondary pump 50' has a characteristic pumping capacity capable of generating a fourth volumetric fluid flow rate $R_4'$ through an additional air permeable partition 37 to an additional secondary filter output port 38', and capable of generating, in combination with the secondary pump 50, a fifth volumetric fluid flow rate $R_5'$ through an additional primary filter output port 36'; (iii) the second additional secondary pump 50" has a characteristic pumping capacity capable of generating a sixth volumetric fluid flow rate $R_6'$ through a second additional air permeable partition 37 to a second additional secondary filter output port 38" coupled to the air exhaust port 14, and capable of generating, in combination with the additional secondary pump 50', a seventh volumetric fluid flow rate $R_7'$ through a second additional primary filter output port 36"; and such that (iv) the sixth volumetric fluid flow rate $R_6'$ is greater than a characteristic average net fluid volume return rate of the fuel storage system 12. To maximize system efficiency, the volumetric fluid flow rate through the air exhaust port 14 is approximately two to five times greater than the characteristic average net fluid volume return rate, or at least two times greater than the characteristic average net fluid volume return rate.

An additional filter input port 32' is coupled to the secondary filter output port 38 and a second additional filter input port 32" is coupled to the additional secondary filter output port 38'. An additional primary filter output port 36' and a second additional primary filter output port 36" are coupled to the pollutant return port 22. Referring to FIG. 2, the preferred flow rates (R) and associated hydrocarbon concentrations (HC) for one embodiment of the present invention are as follows, where $HC_6$ represents the hydrocarbon concentration of the fluid vented to the atmosphere:

| Flow Rate standard cubic feet per hour (scfh) | Hydrocarbon Concentration % of fluid flow |
|---|---|
| $R_1$ = 320 scfh | $HC_1$ = 80% |
| $R_2'$ = 160 scfh | $HC_2$ = 59.93% |
| $R_3'$ = 160 scfh | $HC_3$ = 99.998% |
| $R_4'$ = 80 scfh | $HC_4$ = 25.54% |
| $R_5'$ = 80 scfh | $HC_5$ = 95.01% |

-continued

| Flow Rate standard cubic feet per hour (scfh) | Hydrocarbon Concentration % of fluid flow |
|---|---|
| $R_6'$ = 40 scfh | $HC_6$ = 1.54% |
| $R_7'$ = 40 scfh | $HC_7$ = 47.61% |

Because the hydrocarbon concentration of the fluid vented to the atmosphere $HC_6$ is on the order of about 1%, it is possible to eliminate VOC emissions entirely by installing a microwave unit 60 proximate the air exhaust port 14. The microwave unit 60 is tuned to break down any remaining VOC's in the exhaust stream.

In the embodiment illustrated in FIG. 2, the volumetric fluid flow rate through the air exhaust port 14 is selected such that it is greater than a characteristic average net fluid volume return rate of the fuel storage system 10 to ensure that harmful pollutants are not vented to the ambient due to over pressurization, and to ensure that the filter system 16 of the present invention operates at maximum efficiency. The specific value of the selected second volumetric fluid flow rate $R_2$ is largely dependent upon the average fuel dispensing rate of the particular fuel storage system, however, it is contemplated by the present invention that, in many preferred embodiments of the present invention, the volumetric fluid flow rate through the air exhaust port 14 is between approximately 15 standard cubic feet per hour and approximately 150 standard cubic feet per hour, or, more specifically, 40 standard cubic feet per hour.

It is contemplated by the present invention that, if only one additional filter assembly 30' is utilized according to the present invention, the primary filter pump 40, the secondary filter pump 50, and the additional secondary pump 50' are preferably characterized by respective pumping capacities capable of generating a volumetric fluid flow rate through the air exhaust port 14 greater than the characteristic average net fluid volume return rate of the system.

The characteristics of the filter system 16 of the present invention allow the additional secondary pumps 50', 50" to be designed to create a pressure drop of about 50 kPa across the respective air-permeable partitions 37. In some embodiments of the present invention, it is contemplated that the additional secondary pumps 50', 50" may be designed to create a pressure drop of between approximately 25 kPa and approximately 75 kPa or, more preferably, between approximately 37.5 kPa and approximately 62.5 kPa across the respective air-permeable partitions 37.

Having described the invention in detail and by reference to preferred embodiments thereof, it will be apparent that modifications and variations are possible without departing from the scope of the invention defined in the appended claims.

What is claimed is:

1. A diagnostic fuel storage system comprising:

at least one storage tank including a fuel vapor vent port;

a filter system comprising a filter input port coupled to said fuel vapor vent port;

at least one pump positioned to cause fuel vapor to pass through said filter input port, wherein said storage tank, said filter system, and said pump are arranged such that said storage tank and selected fuel vapor ducts in communication with said storage tank operate below atmospheric pressure; and at least one pressure sensor configured to monitor pressure at one or more diagnostic points within said storage tank, said selected fuel vapor ducts, and combinations thereof.

2. A diagnostic fuel storage system as claimed in claim 1 further comprising a data processor configured to generate a pressure data profile of said fuel storage system.

3. A diagnostic fuel storage system as claimed in claim 1 further comprising a data processor configured to generate a leak alarm in the event pressure monitored at one of said diagnostic points exceeds a predetermined level.

4. A diagnostic fuel storage system as claimed in claim 3 wherein said storage system includes a plurality of sensors and said data processor is configured to correlate a position of a selected sensor with said excessive pressure.

5. A diagnostic fuel storage system as claimed in claim 1 wherein said pressure sensor is operative to provide an indication of operation above atmospheric pressure.

6. A diagnostic fuel storage system comprising:

a plurality of fuel storage systems, each of said fuel storage systems including at least one storage tank including a fuel vapor vent port, a filter system comprising a filter input port coupled to said fuel vapor vent port, at least one pump positioned to cause fuel vapor to pass through said filter input port, wherein said storage tank, said filter system, and said pump are arranged such that said storage tank and selected fuel vapor ducts in communication with said storage tank operate below atmospheric pressure; and at least one pressure sensor configured to monitor pressure at one or more diagnostic points within said storage tank, said selected fuel vapor ducts, and combinations thereof, whereby said pressure sensor is operative to provide an indication of operation above atmospheric pressure;

a central data processor configured to process pressure data sensed by said pressure sensors; and a communications link coupling said central data processor to each of said fuel storage systems.

7. A diagnostic fuel storage system as claimed in claim 6 wherein said plurality of fuel storage systems include at least one remote storage system.

8. A diagnostic fuel storage system as claimed in claim 6 wherein said plurality of fuel storage systems include a plurality of remote storage systems.

9. A diagnostic fuel storage system as claimed in claim 6 wherein said communications link comprises a network, an electrical link, an optical link, an RF link, an combinations thereof.

* * * * *